United States Patent [19]

Stearns

[11] Patent Number: 4,949,295

[45] Date of Patent: Aug. 14, 1990

[54] TRANSFORMATION OF DIVISOR AND DIVIDEND IN DIGITAL DIVISION

[75] Inventor: Charles C. Stearns, Palo Alto, Calif.

[73] Assignee: LSI Logic Corporation, Milpitas, Calif.

[21] Appl. No.: 220,768

[22] Filed: Jul. 18, 1988

[51] Int. Cl.⁵ .............................................. G06F 7/38
[52] U.S. Cl. .................................... 364/748; 364/761
[58] Field of Search ......................... 364/748, 761–767

[56] References Cited

U.S. PATENT DOCUMENTS 4,760,550  7/1988  Katzman et al. ..................... 364/748
4,785,412  11/1988  Tran .................................... 364/761

OTHER PUBLICATIONS

"Simple Radix–4 Division with Divisor Scaling", by Milos D. Ercegovac & Tomas Lang, Computer Science Department Technical Report, University of California, Los Angeles, CA 90024–1596, Mar. 1987, pp. 1–24.
Atkins, "The Theory and Implemtation of SRT Division", Computer Science, University of Illinois, Urbana, Ill., Report No. 230, Jun. 1, 1967.
Atkins, "Higher–Radix Division Using Estimates of the Divisor and Partial Remainders", IEEE Trans. on Computers, vol. C-17, No. 10, Oct. 1968.
Hwang; "Computer Arithemetic", John Wiley & Sons, 1979, pp. 213–239.
Ercegovac et al., "A Division Algorithm with Prediction of Quotient Digits", Proc. 7th IEEE Symposium on Computer Arithmetic, Jun. 1985, pp. 51–56.
Robertson, "Normalization and Quotient Digit Selection for a Variable Precision Arithmetic Unit", University of Illinois, Report No. UIUCDCS-R-86-1229, Apr. 1986.

Primary Examiner—Gary V. Harkcom
Assistant Examiner—Tan V. Mai
Attorney, Agent, or Firm—Skjerven, Morrill, MacPherson, Franklin & Friel

[57] ABSTRACT

A method to adjust the divisor and dividend, for application to a divider, so that the mantissa part of the divisor is transformed to be within a known limited range. The limiting of the transformed divisor range enables the complexity of the quotient select logic to be reduced accordingly. Once the divisor is restricted to the selected range, the dividend is adjusted proportionally so the quotient is unchanged.

12 Claims, 5 Drawing Sheets

| QUOTIENT<br>DIGIT $q_j+1$ | DD = 1.11<br>DR = 1.01 | |
|---|---|---|
| 1 | 1.11 | → $r_{p_0}$ |
| 2 | −1.0 1 | → $q_1 DR$ |
|  | 10.0 0 | → $r_{p_1}$ |
| −1 | −10.1 0 | → $q_2 DR$ |
|  | −10.0 0 | |
| −2 | + 1.0 1 | |
|  | −11.0 0 | |
| −1 | +10.1 0 | |
|  | −10.0 0 | |
| −2 | + 1.0 1 | |
|  | −11.0 0 | |
| −1 | +10.1 0 | |
|  | −10.0 0 | |
| −2 | + 1.0 1 | |
|  | −11.0 0 | |
| −1 | +10.1 0 | |
|  | −10.0 0 | |

| QUOTIENT<br>DIGIT $q_j+1$ | DD = 1.11<br>TDD = 10.0011 | DR = 1.01<br>TDR = 1.1001 |
|---|---|---|
| 2 | 10.0 0 1 1 | → $r_{p_0}$ |
| −2 | −11.0 0 1 0 | → $q_1 TDR$ |
|  | −11.1 1 0 0 | → $r_{p_1}$ |
| −1 | +11.0 0 1 0 | → $q_2 TDR$ |
|  | −10.1 0 0 0 | |
| −2 | + 1.1 0 0 1 | |
|  | −11.1 1 0 0 | |
| −1 | +11.0 0 1 0 | |
|  | −10.1 0 0 0 | |
| −2 | + 1.1 0 0 1 | |
|  | −11.1 1 0 0 | |
| −1 | +11.0 0 1 0 | |
|  | −10.1 0 0 0 | |
| −2 | + 1.1 0 0 1 | |
|  | −11.1 1 0 0 | |
| −1 | +11.0 0 1 0 | |
|  | −10.1 0 0 0 | |

TRANSFORMATION OF DIVISOR AND DIVIDEND IN DIGITAL DIVISION

FIELD OF THE INVENTION

This invention relates to a method for performing digital division and in particular to an improved method for transforming a divisor and dividend before an iterative division process begins.

BACKGROUND OF THE INVENTION

The SRT (Sweeney, Robertson, Tocher) algorithm has been employed for some time in digital division to divide a divisor into a dividend to produce a quotient. The basic SRT type algorithm will be reviewed along with a particular prior art method to select a quotient using a Partial Remainder-Divisor (P-D) plot. My inventive method of transforming, or pre-adjusting, the divisor and dividend may, however, be used in a number of other division methods which will become apparent to those skilled in the art.

The general SRT algorithm uses nonrestoring floating point division where the quotient may be positive or negative and is selected from the signed digit set $$\{-m, \ldots, -1, 0, 1, \ldots, m\} \quad (1)$$

where $$\frac{r-1}{2} \leq m \leq r-1, \quad (2)$$

r being the radix used in the division.

Digital division consists of the basic operations of normalization, a recursive process, and a terminal operation, e.g., changing the form of the remainder. Since the recursive process is repetitive, time saved on each recursive step results in a substantial time savings in the overall division process.

Normalization, using the IEEE standard for floating point division, requires the divisor and dividend to be in the range $$1 \leq DR < 2, \text{ and} \quad (3)$$

$$1 \leq DD < 2, \quad (4)$$

where DR is the divisor and DD is the dividend. These ranges are easily obtained by shifting the binary divisor and dividend until the first nonzero digit (i.e., 1) is to the left of the radix point.

The recursive relationship is defined by $$P_{j+1} = rp_j - q_{j+1} DR, \quad (5)$$

where
- $j$ = the recursive index = 0, 1, ..., n−1
- $p_j$ = the partial remainder used in the jth cycle
- $p_o$ = the dividend DD
- $p_n$ = the remainder
- $q_j$ = the jth quotient digit in a resulting quotient of the form
  $q_0 \cdot q_1 q_2 \ldots q_n$
- $n$ = the number of digits in the quotient
- $DR$ = the divisor, and
- $r$ = the radix.

This recursive relationship is amply discussed in the report, "The Theory and Implementation of SRT Division", by D. Atkins, Report No. 230, Dept. of Computer Sci., University of Ill., Urbana, Illinois, June 1, 1967, incorporated herein by reference, and in the article, "Higher-Radix Division Using Estimates of the Divisor and Partial Remainders", by D. Atkins, IEEE Trans. on Computers, Vol. C-17, No. 10, Oct. 68, incorporated herein by reference.

A simple example of division using the recursive method of equation 5 is shown below as equation 6, where 7 is the divisor and 5 is the dividend, and where
- $j = 0$ (initially)
- $p_o = DD = 5$
- $DR = 7$
- $rp_o = 50$
- $q_{j+1} DR = 7 \times 7 = 49$
- $p_{j+1} = 1$, and
- $r = 10$ $$\begin{array}{r} .71 \\ 7 \overline{)\phantom{0}5.00} \\ \underline{49} \\ 10 \end{array} \quad (6)$$

As seen, the partial remainder $p_{j+1}$ is obtained by multiplying $q_{j+1}$ by the divisor DR and subtracting this product from the shifted partial remainder $rp_j$.

One of the advantages of using nonrestoring division is that the quotient digits can comprise positive and negative digits, allowing a quotient to be expressed in more than one way, or redundantly. For example in radix 4 division, where the range of $q_{j+1}$ is chosen to be $\{-2, -1, 0, 1, 2\}$, the decimal number six may be expressed with two quotient digits as follows, where $\overline{X}$ represents the negative of X:

$$q_1 q_2 \rightarrow 2\ \overline{2} = 8 - 2, \text{ or} \quad (7)$$

$$q_1 q_2 \rightarrow 1\ 2 = 4 + 2. \quad (8)$$

This redundancy permits a range of $q_{j+1}$ instead of a precise $q_{j+1}$, since the error of $q_{j+1}$ can be compensated for in $q_{j+2}$. Hence, with redundancy, the comparison of divisor DR and shifted partial remainder $rp_j$ need not be precise to select a valid $q_{j+1}$, and no time is spent having to restore a partial remainder $p_{j+1}$ to a positive value when a selected quotient digit $q_{j+1}$ is too large, as required in a restoring type division method.

The required number of bits, or precision, of the divisor and shifted partial remainder necessary to generate a valid $q_{j+1}$ will now be determined. In manual division, without redundant quotient digits, $p_{j+1}$ is made to be in the range $$0 \leq p_{j+1} \leq DR; \quad (9)$$

otherwise, a new $p_{j+1}$ must be selected. With redundant quotient digits, however, a negative $p_{j+1}$ is allowed, and thus, the range restriction is $$|p_{j+1}| \leq K|DR|, \quad (10)$$

where K is the normalized amount of redundancy. Since the range of $|p_{j+1}|$ is related to the amount of redundancy in the quotient, and the amount of redundancy in the quotient is related to the digit set of equations 1 and 2, then $|p_{j+1}|$ is related to m, where $2m+1$ is the number of possible digits in each quotient digit $q_{j+1}$ and m is in the range $$\frac{r-1}{2} \leq m \leq r-1. \tag{11}$$

Since maximum redundancy is achieved with a maximum m of r−1, the maximum range of $|p_{j+1}|$ is $$|p_{j+1}| \leq |DR| \tag{12}$$

Hence, for maximum redundancy, $$K = \frac{m}{r-1} = 1. \tag{13}$$

For minimum redundancy, $$m = \frac{r-1}{2},$$

and hence, $$K = \frac{m}{r-1} = \frac{1}{2}. \tag{14}$$

To illustrate the redundancy of $q_{j+1}$ in a division process, equation 5, shown again below, $$p_{j+1} = rp_j - q_{j+1}DR \tag{5}$$

is plotted as $p_{j+1}$ vs. $rp_j$ in FIG. 1. The value $rp_j$ is expressed along the x-axis in terms of the divisor DR. The upper and lower bounds of $p_{j+1}$ are shown as +DR and −DR, respectively; this assumes that K equals unity in accordance with equation 12 and, thus, $$m = r-1, \tag{15}$$

meaning that there is maximum redundancy, or overlap, in the quotient. The diagonal "q-lines" have a slope r, where r is the radix. The left and right boundaries are determined by the number of quotient digits, m, where in FIG. 1 the right boundary has an upper vertex being the intersection of q-line $q_{j+1}=m$ and $p_{j+1}=+DR$, and the left boundary has a lower vertex being the intersection of q-line $q_{j+1}=m$ and $p_{j+1}=-DR$.

As seen, redundancy is illustrated in FIG. 1 by the example where an $rp_j$ of approximately 2.5DR can have a corresponding $q_{j+1}$ of either 2 or 3. Depending on whether $q_{j+1}$ is chosen to be 2 or 3, $p_{j+1}$ will result in either a positive remainder or a negative remainder. Since a certain range exists for $rp_j$ where $q_{j+1}$ can either be a 2 or 3, only the first few significant bits of the shifted partial remainder $rp_j$ need to be examined in order to select a valid $q_{j+1}$. The selected value of $q_{j+1}$ is then multiplied by the actual precise divisor DR and subtracted from the actual precise $rp_j$, as dictated by the recursive relationship of equation 5, to determine $p_{j+1}$. $P_{j+1}$ is then shifted to become $rp_j$, and the first few significant bits of $rp_j$ are then used to select the next $q_{j+1}$ and corresponding $p_{j+1}$. Hence, the amount of redundancy determines how many bits of $rp_j$ and DR must be taken into account to select a valid $q_{j+1}$.

As seen, redundancy is determined by the number of possible digits for each $q_{j+1}$ value (i.e., 2m+1), where, given a radix r, $$\frac{r-1}{2} \leq m \leq r-1. \tag{11}$$

The optimal choices of m, and thus K, of equation 10 depend on design trade-offs. For example, choosing a large m value (e.g., $m=r-1$) necessitates added hardware complexity but increases the redundancy, or K value, of the quotient. The increased redundancy results in the ability to inspect fewer bits of the shifted partial remainder $rp_j$ and divisor DR when selecting a quotient digit $q_{j+1}$. Added background material regarding high-radix division may be found in the book, "Computer Arithmetic", by K. Hwang, John Wiley & Sons (1979), pp. 213–239, incorporated herein by reference, and the aforementioned report and article by D. Atkins.

Another graphical representation of the relationship between DR, $rp_j$, and $q_{j+1}$ is illustrated in a partial remainder vs. divisor (P-D) plot, shown in FIG. 2. FIG. 2 shows a P-D plot for $r=4$ and $m=2$, where the $q_{j+1}$ digits are selected from the group $\{-2, -1, 0, 1, 2\}$. As in the $p_{j+1}$ vs. $rp_j$ plot of FIG. 1, the P-D plot of FIG. 2 is based on the recursive relationship of equation 5.

As seen from FIG. 2, the intersection of divisor DR and shifted partial remainder $rp_j$ (in this case $4p_j$) may fall within overlapping $q_{j+1}$ values, where either $q_{j+1}$ value is valid. The selected $q_{j+1}$ value is then multiplied by the full divisor DR and subtracted from the full shifted partial remainder $rp_j$ to determine $p_{j+1}$. The plot is symmetric about both the x and y axes.

The plot is derived from the following general parameters. For a fixed quotient digit $q_{j+1}$, the upper limit of $rp_j$ as a function of the divisor DR occurs when $p_{j+1}$ is a maximum, as seen by equation 5. Partial remainder $p_{j+1}$ is, therefore, a maximum when $$p_{j+1} = \frac{m}{r-1} DR, \tag{16}$$

where $m/r-1$ is equal to the measure of redundancy, K. Hence, from equation 5, $rp_j$ is a maximum when $$rp_{jmax} = \left(\frac{m}{r-1} + q_{j+1}\right)DR. \tag{17}$$

Partial remainder $p_{j+1}$ is a minimum when $$p_{j+1} = \frac{-m}{r-1} DR. \tag{18}$$

Hence, $$rp_{jmin} = \left(\frac{-m}{r-1} + q_{j+1}\right)DR. \tag{19}$$

By plotting the linear equations of equations 17 and 19 for a fixed $q_{j+1}$ as functions of DR, with $q_{j+1}$ ranging from −m to m in steps of 1, a P-D plot, such as shown in FIG. 2, is developed for a given m and r. The shifted partial remainder $rp_j$ value in terms of the divisor DR is given for each q-line of the P-D plot on the right side of FIG. 2 and is equivalent to the slope of the q-line.

In accordance with the P-D plot of FIG. 2, a given value of the divisor DR and shifted partial remainder $rp_j$, where radix $r=4$, will specify a point in an area between rp$_{jmax}$ and rp$_{jmin}$ denoted as a q(i) area, where q$_{j+1}$=i. The selected q$_{j+1}$ is then used in forming the next partial remainder p$_{j+1}$. The redundancy of q$_{j+1}$ is demonstrated by the overlapping of consecutive q(i) areas where either i or i−b 1 is a valid choice for q$_{j+1}$. This overlapping of q(i) areas allows the divisor DR and shifted partial remainder rp$_j$ to be only within a certain range for the selection of a valid q$_{j+1}$. Steps have been drawn with dashed lines within the overlapping q(i) areas in FIG. 2 which illustrate various arbitrary divisor DR intervals within boundaries defined by the first four significant bits of divisor DR. The steps illustrate that only the first four bits of the divisor DR need to be inspected to determine the DR interval, which in turn provides the necessary precision to select a valid q$_{j+1}$. These steps may be modified to represent any interval of the divisor DR where a single interval of DR is defined within selected boundaries and where any DR within that interval results in the selection of a valid q$_{j+1}$ given a sufficiently precise rp$_j$ value.

The vertical distance between two steps in consecutive overlapping q(i) areas defines the maximum range of the shifted partial remainder rp$_j$ for the permissible divisor DR interval. In FIG. 2, the steps are drawn so that the ranges of rp$_j$ are defined within boundaries defined by the first four significant bits of the shifted partial remainder rp$_j$. Thus, imaginary rectangles are formed between the steps within consecutive overlapping q(i) areas representing a range of divisors DR and shifted partial remainders rp$_j$ which are associated with a particular q$_{j+1}$.

In a division operation, the maximum and minimum values within a selected range of the shifted partial remainder rp$_j$ and divisor DR in a P-D plot are compared with a sufficient number of high order bits of the actual shifted partial remainder rp$_j$ and divisor DR to determine which of the ranges rp$_j$ and DR fall into, and a q$_{j+1}$ is selected.

As seen by inspection of FIG. 2, the intervals of the divisor DR can be increased in range as the divisor DR increases from a value of 1.0 to 2.0.

One way to implement a divider is to design hardware and software to logically duplicate the P-D plot method of selecting a q$_{j+1}$. This class of divider is referred to as a table look-up model.

Some division techniques which do not use a table look-up model transform the divisor to enable a more efficient selection of q$_{j+1}$. One such algorithm has been proposed by Milos Ercegovac et al. in a paper entitled "A Division Algorithm with Prediction of Quotient Digits", Proc. 7th IEEE Symposium on Computer Arithmetic, June 1985, pp. 51–56. In the Ercegovac method, the quotient digits are directly determined based on an estimate, or rounding, of the partial remainder. For the rounded partial remainder to directly determine the proper quotient digit, the divisor DR is transformed to be in the range $$1-\alpha \leq DR \leq 1+\alpha, \quad (20)$$

where $\alpha$ is a constant between zero and one and is defined by the equation, $$\alpha \leq \frac{1}{r}\left[1 - \frac{(r-1)(2^{-k+1} + 2^{-l})}{p}\right], \quad (21)$$

and where p is the highest digit in the quotient digit set (i.e., $-p \leq q \leq p$), k is the fractional digit position after which the partial remainder is truncated, and r is the radix.

The dividend then has to be adjusted commensurate with the transformation of the divisor so as not to affect the quotient. As is apparent, the implementation of the algorithm to transform the divisor is fairly complex and cannot be practically implemented in an integrated circuit.

In an SRT divider, the cycle time (i.e., time to complete each iteration) is dominated by the time it takes to generate each q$_{j+1}$ by inspecting the most significant bits (msb's) of the shifted partial remainder rp$_j$ and divisor DR. The logic required to determine q$_{j+1}$ from these msb's is called the quotient select logic. For higher radix dividers (e.g., r>2), large amounts of logic are required for quotient selection, and, for larger designs, ROM's are involved. Consequently, with more quotient select logic, the divider speed is reduced.

The prior art has proposed various methods to scale the divisor and dividend to reduce the size of the quotient logic. Milos Ercegovac has proposed one method, as stated previously, where the divisor is transformed into a range between $1+\alpha$ and $1-\alpha$, where $\alpha$ is a constant between zero and one. J. Robertson, in a paper entitled, "Normalization and Quotient Digit Selection for a Variable Precision Arithmetic Unit", University of Illinois, Report No. UIUCDCS-R-86-1229, April 1986, set out to simplify the quotient select hardware by normalizing the divisor. Mr. Robertson's paper is primarily concerned with how to get radix four numbers into a normalized fractional format.

Up until now no easily implemented method of increasing the efficiency and speed of a divider, such as one incorporating a look-up table model, has been publicly proposed.

SUMMARY OF THE INVENTION

The present inventive method adjusts the divisor and dividend, for application to a divider, so that the divisor is transformed to be within a selected narrow range and at the same time transformed to an increased value approaching a maximum value of 2.0. By restricting the divisor to a smaller range, the number of possible intervals the divisor may be within is reduced, resulting in reduced quotient select logic. If the range of the transformed divisor is sufficiently small, the most significant bits (msb's) of this transformed divisor need not even be inspected and the values of q$_{j+1}$ can then be generated solely by inspecting the msb's of the shifted partial remainders rp$_j$.

Once the divisor is restricted to the selected range, the dividend is adjusted proportionally so the quotient is unchanged. The transformed divisor and dividend are then applied to a divider requiring less quotient select logic and, hence, having a shorter cycle time.

BRIEF DESCRIPTION OF THE DRAWINGS

FIG. 3 shows a binary division process using a non-transformed divisor and dividend.

FIG. 4 shows a binary division process using a transformed divisor and dividend.

DETAILED DESCRIPTION

In a high radix SRT algorithm it is much more advantageous to have the divisor in a small as possible range whose lower bound is as great as possible. The current IEEE standard dictates that divisors and dividends for floating point dividers be in the range [1.0, 2.0]. With the divisor in a small predictable range, less quotient select hardware is needed and, as the divisor approaches its upper limit, less and less precision is needed to select a valid quotient. This requirement for less precision can be seen in FIG. 2, which is a plot of shifted partial remainder $rp_j$ vs. divisor DR. As the overlapping areas corresponding to consecutive quotient values extend out toward the maximum divisor DR value of 2.0, the overlapped areas become larger. As a consequence of this, the width of the steps drawn in the overlapped $q_{j+1}$ regions are shown to increase as divisor DR increases. The width of these steps represents the range of divisor DR for which the corresponding quotient $q_{j+1}$ is valid for a certain range of shifted partial remainder $rp_j$.

My inventive method is to pre-adjust the divisor into the most desirable range, using a highly efficient transforming means, in order to reduce the complexity of the divider circuitry and increase the speed of the divider.

Pre-adjusting divisor DR and dividend DD by equal proportions does not affect the quotient Q. Hence, the following relationship holds true:

$$\frac{DD}{DR} = \frac{DD + \frac{1}{2}DD + \frac{1}{4}DD + \ldots}{DR + \frac{1}{2}DR + \frac{1}{4}DR + \ldots} = Q. \quad (22)$$

The transformation of the divisor can be easily and quickly accomplished by shifting the original divisor and adding the original divisor to the shifted value. Transformation of the dividend is accomplished in a similar manner. Any combination of fractions of the form $(1)/(2^x)DR$, where x is a whole number $>1$, may be added to the original divisor to raise the divisor to a value within a specified range such that, in one embodiment, no bits of the divisor need be inspected by the divider circuitry to determine that the transformed divisor (TDR) falls within a certain range; hence, only the msb's of the shifted partial remainder $rp_j$ need be inspected to select a valid quotient digit $q_{j+1}$.

Figure 1:
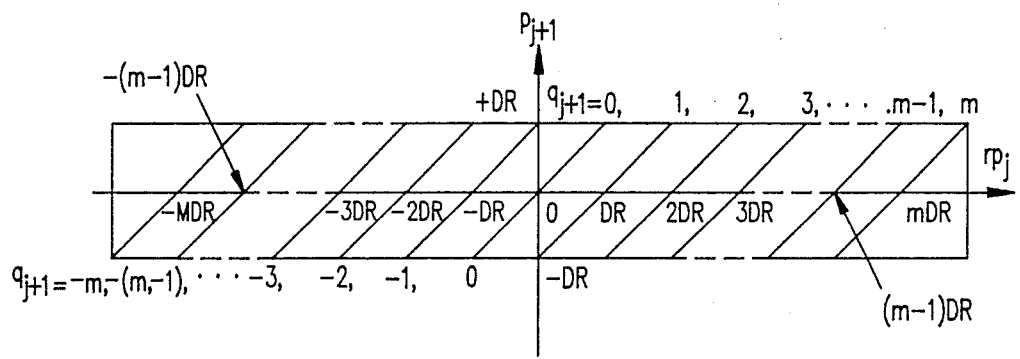
FIG. 1 is a plot of shifted partial remainder rp$_j$ vs. partial remainder p$_{j+1}$.
Figure 2:
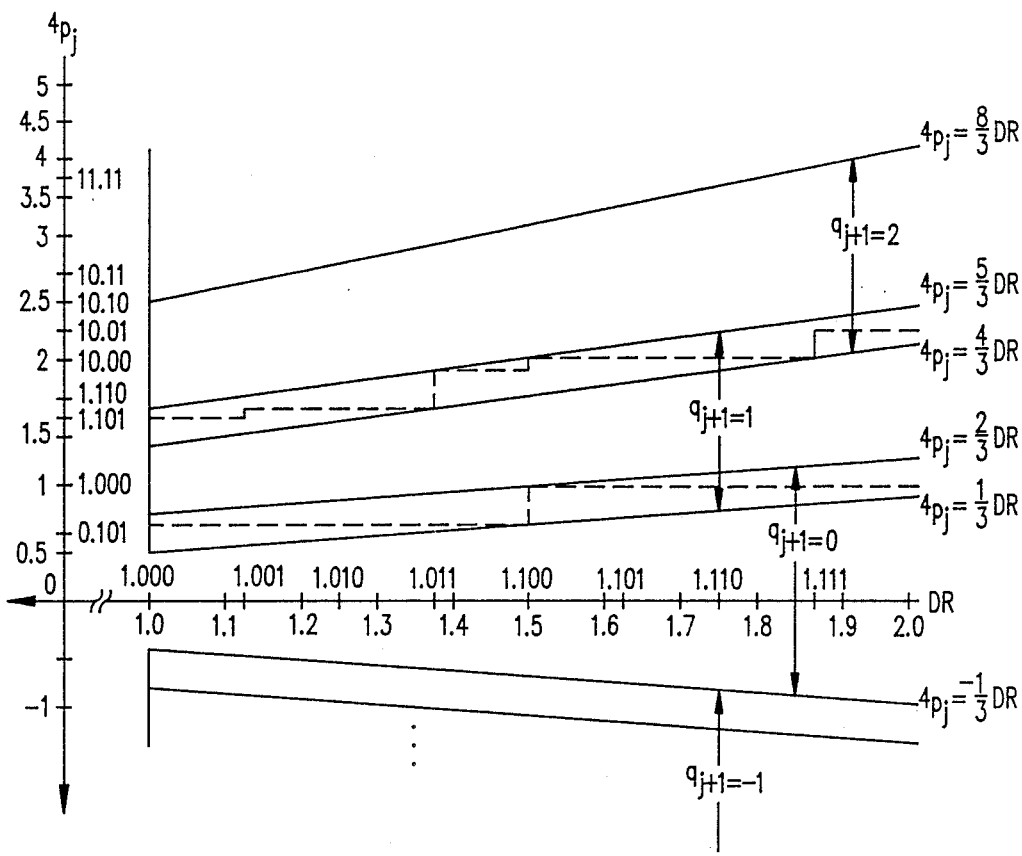
FIG. 2 is a P-D plot of divisor DR vs. shifted partial remainder rp$_j$ for radix 4 and m=2.

As an example of a prior art method of division, FIG. 3 shows the binary division of 1.75 by 1.25 using the P-D plot of FIG. 2, where radix=4 and the quotient digits are chosen from the set $\{-2, -1, 0, 1, 2\}$ (i.e., m=2). Dividend DD starts out as its binary equivalent "0001.11" and divisor DR as its binary equivalent of "0001.01".

Time flows from the top to the bottom of the figure with each line representing one iteration cycle. The quotient bits in radix four format are shown vertically on the left side of FIG. 3. The more quotient bits that are generated, the greater the precision of the divider. In the first cycle, the first few bits of divisor DR and dividend DD are inspected and a quotient is selected from the P-D plot of FIG. 2. The next partial remainder, $p_{j+1}$, is calculated using the equation $$p_{j+1} = rp_j - q_{j+1}DR. \quad (23)$$

discussed previously. Negative $rp_j$ values result in negative $q_{j+1}$ values (or a $q_{j+1}$ of zero if the negative $rp_j$ is sufficiently small). Finally the quotient is generated by adding up the various quotient digits taking into account their weights and signs.

Using my inventive method, the original divisor DR of 1.25 is increased by $\frac{1}{4}$DR or to 1.5625. This may be accomplished by adding the original divisor DR shifted to the right two places to the original DR. The dividend DD must similarly be increased by $\frac{1}{4}$DD to 2.1875. Hence, the transformed divisor TDR is 1.1001, and the transformed dividend TDD is 10.0011. FIG. 4 shows the division of the transformed dividend TDD by the transformed divisor TDR using simplified quotient select logic which emulates only the portion of the P-D plot of FIG. 2 between DR=1.5 and DR=2.0. The resulting quotient is identical to that obtained in FIG. 3 and is obtained in less time due to each iteration cycle being hastened by simplified quotient select logic. As seen, if the range of transformed divisor TDR is always transformed to be in the range [1.5, 2.0], then, using the intervals drawn in the P-D plot of FIG. 2 as an example, the simplified quotient select logic only needs to determine in each iteration whether the transformed divisor TDR is within the binary interval [1.100, 1.111] or the interval [1.111, 10.00]. If the divisor DR was not transformed, the quotient select logic would need to determine which of five intervals (shown in the overlap of $q_{j+1}=1$ and $q_{j+1}=2$ between DR=1.0 and DR=2.0) divisor DR was within before selecting a valid quotient digit $q_{j+1}$.

Further, in radix 4 division, if m=3 (i.e., maximum redundancy), then one step, or interval, can be drawn between any overlapping $q_{j+1}$ area in the divisor DR range [1.5, 2.0], with the result that, without inspecting any significant bits of the transformed divisor TDR, a valid $q_{j+1}$ can be selected by just inspecting the most significant bits of the shifted partial remainder $rp_j$, since the transformed divisor is already known to be in the range [1.5, 2.0].

The transformation, as shown in equation 22 can be easily accomplished in hardware and is made before division iteration begins. The most desirable range for the transformed divisor is dependent on the radix of the divider and the redundancy of the quotient, as well as on practical considerations, and can easily be calculated using the equations recited herein. Hence, well-known designs for dividers, but with reduced quotient select circuit complexity, may be utilized to perform division on the transformed divisors and dividends. Demonstrations of maximum redundancy radix 4 dividers which incorporate my inventive method for reducing quotient selection logic show that transforming the divisor into a range of [1.5, 2.0] reduces the time required for division by 50%, resulting in the fastest CMOS floating-point dividers on the market.

Figure 5:
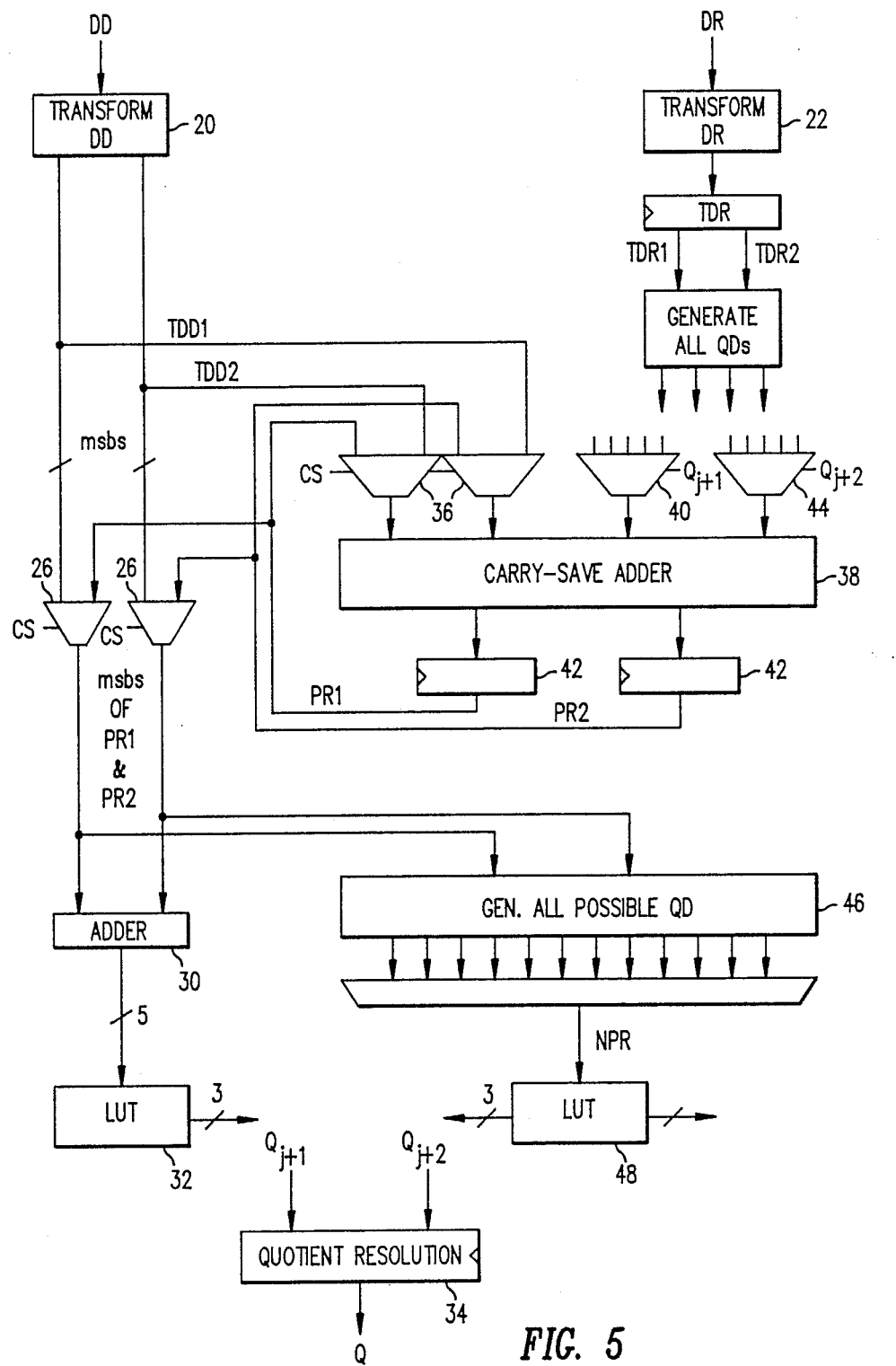
FIG. 5 is a block diagram of a divider incorporating my inventive means for transforming a divisor and dividend.

A simplified block diagram of a double precision radix 16 divider (using two overlapping radix 4 stages) incorporating a means for transforming a divisor DR and a dividend DD in accordance with my invention is shown in FIG. 5. It is to be noted that the divider itself may be constructed using well-known technology and that a variety of division methods and circuits may be employed to determine the quotient of the transformed dividend and the transformed divisor. In FIG. 5, dividend DD and divisor DR are transformed by transforming means 20 and 22, respectively, which will be discussed in more detail later. To generate the partial remainder $p_{j+1}$, the following equation is implemented by the divider of FIG. 5:

$$p_{j+1} = rp_j - q_{j+1} TDR. \qquad (24)$$

The particular divider of FIG. 5 does not need to inspect the transformed divisor TDR in order to select a valid quotient digit $q_{j+1}$, since TDR is within a known predetermined range by action of divisor transforming means 22. Hence, radix 4 look-up table (LUT) logic 32 and 48 merely require as an input the most significant bits (msb's) of the shifted partial remainder $rp_j$ to select a valid $q_{j+1}$.

In the first iteration of the division process, transformed dividend TDD is the initial partial remainder $p_o$. In this first iteration, multiplexers 26 are controlled by control signal CS to pass only the msb's of TDD1 and TDD2, representing the binary TDD in carry-save format, to adder 30, which acts to merge TDD1 and TDD2 and generate TDD in binary format. The output of adder 30, which is the msb's of $p_o$, is applied to LUT logic 32 for selection of a valid $q_{j+1}$. $Q_{j+1}$ is then applied to quotient resolution means 34, which stores the various quotient digits and calculates a final binary quotient.

Also in the first iteration, the full transformed dividend TDD, in carry-save format, is shifted to form $rp_o$ and passed through multiplexers 36, under control of control signal CS, to carry-save adder 38. Another input into carry-save adder 38 is $q_{j+1}$ TDR which is generated by applying both $q_{j+1}$ and the transformed divisor TDR to multiplier 40. Using a 2's complement or equivalent method, the product $q_{j+1}$ TDR is subtracted from $rp_o$ in carry-save adder 38 to generate partial remainder $p_{j+1}$, in carry-save format, which is temporarily stored in registers 42.

In all subsequent iterations, multiplexers 26 and 36 are controlled by control signal CS to block TDD and to pass only the signal applied to a second input of multiplexers 26 and 36. The output of registers 42 (i.e., $p_{j+1}$) are applied to these second inputs of multiplexers 26 and 36. Hence, on the next iteration, the msb's of a shifted $p_{j+1}$ are passed by multiplexers 26 to adder 30, which then applies the resulting msb's of $rp_j$ to LUT logic 32 for selection of further quotient digits $q_{j+1}$. Concurrently, $p_{j+1}$ from registers 42 is applied to the second inputs of multiplexers 36 and is applied to carry-save adder 38 as $rp_j$. The appropriate selected quotient digits are then multiplied by TDR in multipliers 40 and 44 and subtracted from $rp_j$ to generate the next partial remainder $p_{j+1}$.

To increase the speed of the divider, the output of multiplexers 26 is also applied to generation means 46, which takes the present shifted partial remainder $rp_j$ and calculates all possible next shifted partial remainders $rp_{j+1}$. Once LUT logic 32 selects $q_{j+1}$, the actual next shifted partial remainder is immediately selected by generation means 46 from all the possible next shifted partial remainders by simple inspection of $q_{j+1}$. This selected shifted partial remainder is applied to LUT logic 48 which then selects the next quotient digit, $q_{j+2}$. The selected quotient digit is then applied to quotient resolution means 34. Hence, time is saved by not waiting until a new quotient is selected to calculate the shifted partial remainder.

The quotient digit $q_{j+2}$ selected by LUT logic 48 is then multiplied with the TDR in multiplier 44 and the product is subtracted from the present shifted partial remainder by adder 38. The process described above repeats, with LUT logic 32 and LUT logic 48 providing quotient digits to quotient resolution means 34. In this manner the final quotient generated by quotient resolution means 34 is determined.

Figure 6:
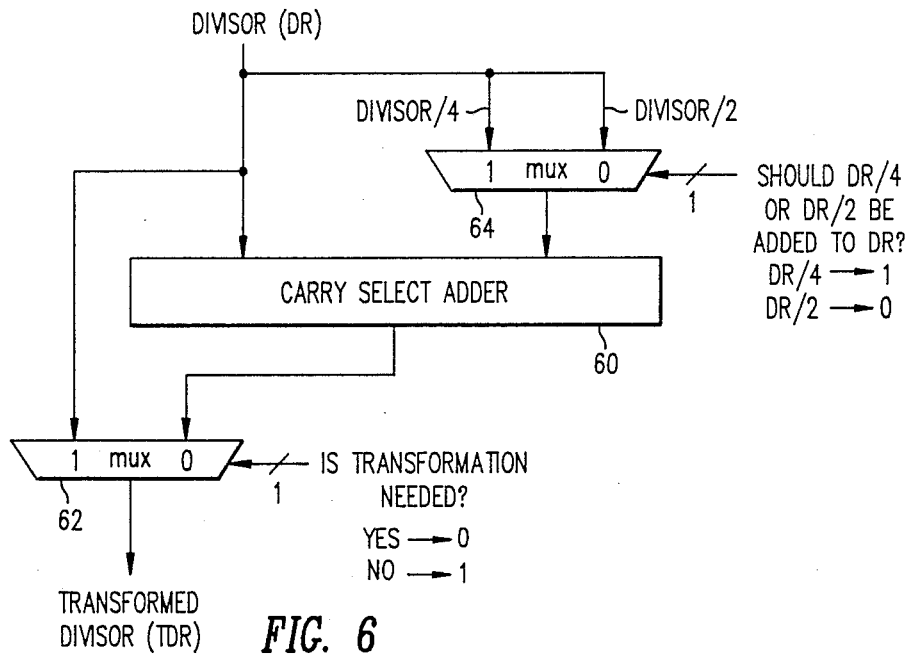
FIGS. 6 and 7 are block diagrams of one embodiment used to transform a divisor and dividend, respectively.

One embodiment of the transformation logic used to transform the divisor is shown in FIG. 6. The original divisor DR is applied to carry-select adder 60 and to multiplexer 62. The most significant bits of the original divisor are inspected to determine if divisor DR is already within the desired range and, hence, if transformation of the divisor is necessary. If transformation is not necessary a "1" is applied to the control terminal of multiplexer 62 and the original divisor is directly applied to the divider means. If the original divisor is not within the desired range, the output of multiplexer 62 will be the output of adder 60. With the logic of FIG. 6, the output of adder 60 will be a value between 1.5 and 2.0. Other logic means may be incorporated by one of ordinary skill in the art to ensure a value closer to 2.0 if desired to place the transformed divisor into a narrower range. A trade-off exists, however, between increasing the transformation logic complexity in order to decrease the complexity of the quotient selection logic.

Depending on the magnitude of the most significant bits of the original divisor DR, either ½DR or ¼DR will be added to DR by action of second multiplexer 64. In FIG. 6, if DR=1.2, it would be desirable to add ½DR to DR to form a transformed divisor TDR of 1.8. If DR was 1.4, it would be desirable to only raise the divisor by ¼DR to form a TDR of 1.75. In this way TDR will be within the range 1.5 to 2.0.

Figure 7:
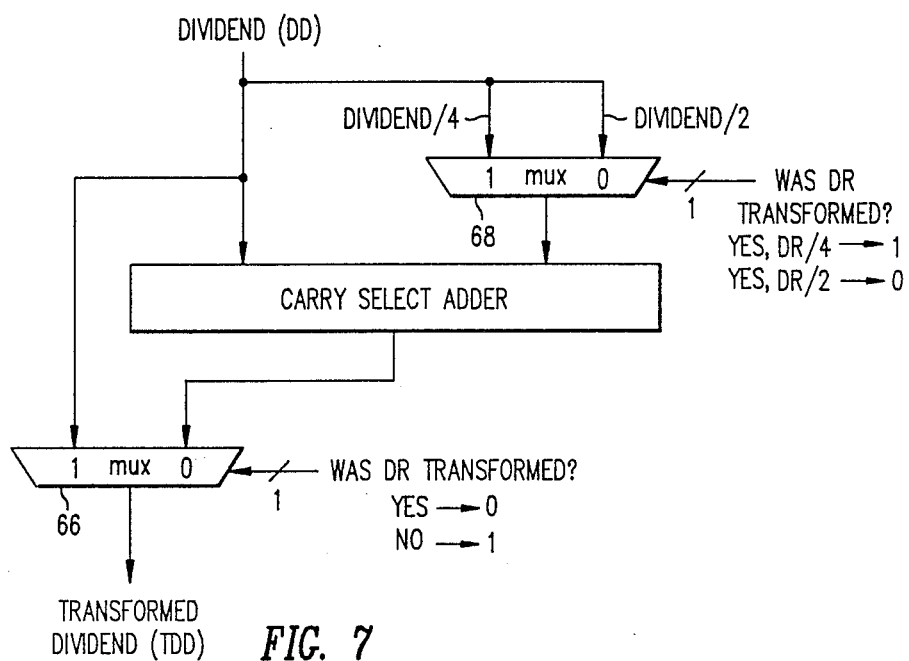

In FIG. 7, the same transformation made to the divisor is made to the dividend and, thus, the transformation logic circuit is identical to that of FIG. 6. In FIG. 7, the same control signals applied to multiplexers 62 and 64 in FIG. 6 are applied to multiplexers 66 and 68 in FIG. 7, so the transformation of the dividend is identical to the transformation of the divisor.

Relatively simple and inexpensive transformation logic, other than that shown in FIGS. 6 and 7, can be implemented to ensure the transformed divisor is within any desired narrow range, with an upper limit of 2.0, in order to reduce the complexity and increase the speed of the quotient select logic a desired amount.

An inventive method has been shown to quickly and inexpensively transform a divisor to enable faster division in a floating-point divider using an SRT type algorithm. Concepts disclosed in this description may be utilized to increase the speed of division in dividers similar to the type using an SRT algorithm and will be obvious to those skilled in the art.

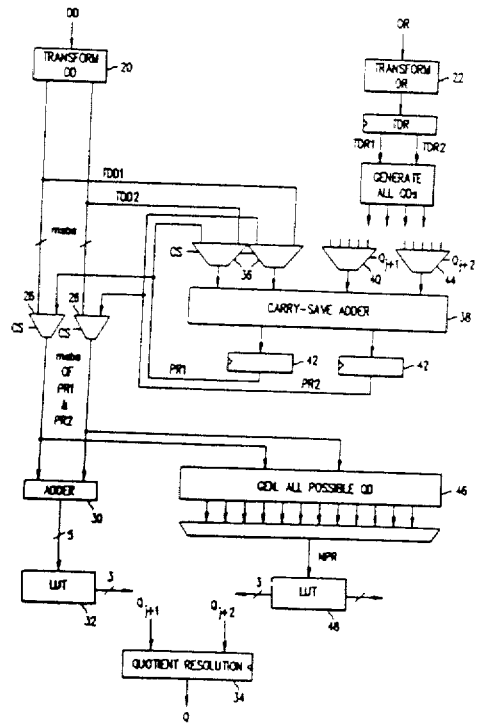

What is claimed is:

1. A method to reduce the complexity of quotient selection logic in a floating-point divider, said divider dividing a divisor into a dividend, said divisor and said dividend having a mantissa part after normalization of said divisor and dividend in conformance with a standard for floating-point division applicable to said divisor and dividend, said normalization of said divisor placing said mantissa part of said divisor within a first range bounded by a maximum allowable value and a minimum allowable value, said method comprising the steps of:

inspecting said mantissa part of said divisor to determine if said mantissa part of said divisor is within a second range, said second range being bounded at a high end to said maximum allowable value of said mantissa part of said divisor and bounded at a low end to a value greater than said minimum allowable value of said mantissa part of said divisor;

transforming said mantissa part of said divisor, prior to dividing and after said normalization of said divisor, up to a value which is within said second range if said mantissa part of said divisor, after normalization, is not already in said second range.

2. The method of claim 1 further comprising the step of transforming said mantissa part of said dividend, prior to dividing and after normalization, by the same ratio used to transform said mantissa part of said divisor.

3. The method of claim 2 wherein said second range is greater than or equal to 1.5 and less than 2.0.

4. The method of claim 2 wherein said second range is greater than or equal to 1.75 and less than 2.0.

5. The method of claim 2 wherein said second range is that necessary to place said mantissa part of said divisor in an interval such that the most significant bits of said mantissa part of said divisor need not be inspected before selecting a valid quotient digit.

6. The method of claim 5 wherein said step of transforming comprises:

adding said mantissa part of said divisor to a fractional part of said mantissa part of said divisor so that the sum is within said second range.

7. The method of claim 6 wherein said fractional part of said mantissa part of said divisor is either ¼ of said mantissa part of said divisor or ½ of said mantissa part of said divisor depending on the value of said mantissa part of said divisor.

8. The method of claim 2 wherein said step of transforming comprises:

adding said mantissa part of said divisor to a fractional part of said mantissa part of said divisor so that a sum is within said second range.

9. The method of claim 8 wherein said fractional part of said mantissa part of said divisor is either ¼ of said mantissa part of said divisor or ½ of said divisor depending on the value of the mantissa part of said divisor.

10. A transforming means for transforming a mantissa part of a divisor, prior to a floating-point division process and after normalization of said divisor in conformance with a standard for floating-point division applicable to said divisor, said normalization of said divisor placing said mantissa part of said divisor within a first range bounded by a maximum allowable value and a minimum allowable value, said transforming means being for transforming said mantissa part of said divisor up to a value which is within a second range if said mantissa part of said divisor, after normalization, is not already in said second range, said second range being bounded at a high end to said maximum allowable value of said mantissa part of said divisor and bounded at a low end to a value greater than said minimum allowable value of said mantissa part of said divisor, said transforming of said mantissa part of said divisor being in order to reduce the complexity of quotient selection logic, said transforming means comprising:

an adder having as inputs said mantissa part of said divisor and a fractional part of said mantissa part of said divisor, wherein an output of said adder is applied to a divider.

11. The transforming means of claim 10 further comprising:

a first multiplexer having inputs being said mantissa part of said divisor and said output of said adder, wherein an output of said first multiplexer is applied to said divider, said output of said first multiplexer being determined by the magnitude of the most significant bits of said mantissa part of said divisor.

12. The transforming means of claim 11 further comprising a second multiplexer having inputs being one-fourth of said mantissa part of said divisor and one-half of said mantissa part of said divisor, wherein an output of said second multiplexer comprises said fractional part of said mantissa part of said divisor and is applied to one input of said adder for summing with said mantissa part of said divisor, said mantissa part of said divisor being applied to a second input of said adder.

* * * * *

UNITED STATES PATENT AND TRADEMARK OFFICE
CERTIFICATE OF CORRECTION

| | | |
|---|---|---|
| PATENT NO. | : | 4,949,295 |
| DATED | : | August 14, 1990 |
| INVENTOR(S) | : | Charles C. Stearns |

It is certified that error appears in the above-identified patent and that said Letters Patent is hereby corrected as shown below:

The title page, showing the illustrative figure, should be deleted and substitute therefor the attached title page.

Column 7, line 44, ">" should read $--\geq--$.

Signed and Sealed this

Twenty-eighth Day of July, 1992

Attest:

DOUGLAS B. COMER

Attesting Officer

Acting Commissioner of Patents and Trademarks

United States Patent [19]

Stearns

[11] Patent Number: 4,949,295
[45] Date of Patent: Aug. 14, 1990

[54] TRANSFORMATION OF DIVISOR AND DIVIDEND IN DIGITAL DIVISION

[75] Inventor: Charles C. Stearns, Palo Alto, Calif.

[73] Assignee: LSI Logic Corporation, Milpitas, Calif.

[21] Appl. No.: 220,768

[22] Filed: Jul. 18, 1988

[51] Int. Cl.⁵ .............................................. G06F 7/38
[52] U.S. Cl. .................................... 364/748; 364/761
[58] Field of Search ........................ 364/748, 761–767

[56] References Cited

U.S. PATENT DOCUMENTS 4,760,550  7/1988  Katzman et al. ................. 364/748
4,785,412  11/1988  Tran ................................. 364/761

OTHER PUBLICATIONS

"Simple Radix-4 Division with Divisor Scaling", by Milos D. Ercegovac & Tomas Lang, Computer Science Department Technical Report, University of California, Los Angeles, CA 90024-1596, Mar. 1987, pp. 1-24.
Atkins, "The Theory and Implemtation of SRT Division", Computer Science, University of Illinois, Urbana, Ill., Report No. 230, Jun. 1, 1967.
Atkins, "Higher-Radix Division Using Estimates of the Divisor and Partial Remainders", IEEE Trans. on Computers, vol. C-17, No. 10, Oct. 1968.
Hwang; "Computer Arithemetic", John Wiley & Sons, 1979, pp. 213-239.
Ercegovac et al., "A Division Algorithm with Prediction of Quotient Digits", Proc. 7th IEEE Symposium on Computer Arithmetic, Jun. 1985, pp. 51-56.
Robertson, "Normalization and Quotient Digit Selection for a Variable Precision Arithmetic Unit", University of Illinois, Report No. UIUCDCS-R-86-1229, Apr. 1986.

Primary Examiner—Gary V. Harkcom
Assistant Examiner—Tan V. Mai
Attorney, Agent, or Firm—Skjerven, Morrill, MacPherson, Franklin & Friel

[57] ABSTRACT

A method to adjust the divisor and dividend, for application to a divider, so that the mantissa part of the divisor is transformed to be within a known limited range. The limiting of the transformed divisor range enables the complexity of the quotient select logic to be reduced accordingly. Once the divisor is restricted to the selected range, the dividend is adjusted proportionally so the quotient is unchanged.

12 Claims, 5 Drawing Sheets